United States Patent [19]

Ahnger

[11] Patent Number: 5,133,298
[45] Date of Patent: Jul. 28, 1992

[54] METHOD AND ARRANGEMENT FOR EFFECTING HEAT ENERGY RECOVERY FROM THE EXHAUST GASES OF A DIESEL ENGINE

[75] Inventor: Anders Ahnger, Vaasa, Finland

[73] Assignee: Oy Wartsila Diesel International Ltd., Helsinki, Finland

[21] Appl. No.: 623,292

[22] Filed: Dec. 5, 1990

[30] Foreign Application Priority Data

Dec. 21, 1989 [FI] Finland ................. 896158

[51] Int. Cl.⁵ ................. F02G 5/02; F22B 1/18
[52] U.S. Cl. ..................... 122/7 R; 60/618
[58] Field of Search ............. 60/618, 39-182; 122/7 R

[56] References Cited

U.S. PATENT DOCUMENTS 2,370,949 3/1945 Gaisberger .................. 60/618
4,901,531 2/1990 Kubo et al. .............. 60/618 X

FOREIGN PATENT DOCUMENTS 310329 1/1919 Fed. Rep. of Germany .
143114 8/1983 Japan .
7905 1/1987 Japan .
962666 10/1982 U.S.S.R. ................. 60/618
400914 1/1932 United Kingdom ........... 60/618

Primary Examiner—Michael Koczo
Attorney, Agent, or Firm—Dellett, Smith-Hill and Bedell

[57] ABSTRACT

At least part of the heat energy contained in the exhaust gases of a diesel engine provided with turbo apparatus is recovered before leading the exhaust gases into the turbo apparatus, and at least the major part of the recovered heat energy is used for producing secondary energy to be availed of independent of the production of mechanical energy by the engine. The heat energy recovered can, with advantage, be utilized for hot water or steam production.

4 Claims, 1 Drawing Sheet

METHOD AND ARRANGEMENT FOR EFFECTING HEAT ENERGY RECOVERY FROM THE EXHAUST GASES OF A DIESEL ENGINE

BACKGROUND OF THE INVENTION

This invention relates to a method for recovering heat energy from the exhaust gases of a big diesel engine provided with turbo apparatus and to an arrangement for implementing the method.

A "big diesel engine", as that term is used herein, means an engine suitable for an electricity generating plant or for a ship's power plant and the mechanical power output of which is, for instance, above 1 MW, even 20 MW or more. Such an engine is generally provided with a turbo apparatus driven by the exhaust gases for introducing charge air into the engine's cylinders. With an engine of this size it is often desired to make use of not only the mechanical energy generated by the engine but also the waste heat, or so-called secondary energy. For this purpose an exhaust gas boiler for heat energy recovery is generally mounted on the exhaust pipe of the engine right after the turbo apparatus. The temperature of the exhaust gases of a modern diesel engine, however, is relatively low, and the temperature falls further when passing through the turbo apparatus. Consequently, the heat exchanging surface of the exhaust gas boiler is quite large in relation to the heat energy to be recovered, and the exhaust gas boiler is large and costly. If the recovered heat energy is used for steam production, the relatively low temperature limits the pressure of the generated steam to about 4–16 bar, which corresponds to about 143°–201° C. for saturated steam.

SUMMARY OF THE INVENTION

The invention may be used to improve recovery and utilization of heat energy from the exhaust gases of a big diesel engine especially in a heating power plant, that is, a power plant that provides a thermal power output, such as steam for local heating, in addition to driving a mechanical load, such as an electrical generator or a ship's propeller, while avoiding the disadvantages of known methods for recovering and utilizing secondary energy. More specifically, the aim is to provide a solution for improving the total efficiency ratio of a power plant based on the use of diesel engines.

The basic perception underlying the invention is the fact that when an engine is operated at a high percentage of its rated power output, the exhaust gases include, in addition to the energy needed for a turbo apparatus connected to the engine, also extra energy, which can be availed of without a noticeable effect on the operational efficiency of the turbo apparatus. Thus, in accordance with the invention at least part of the heat energy contained in the exhaust gases of the engine is recovered before leading the exhaust gases into the turbo apparatus, whereby at least the main part of the recovered heat energy is used for producing secondary energy to be availed of independent of the production of mechanical energy by the engine. In practice, this is arranged so that the exhaust gases of the engine are first led into the exhaust gas boiler and only thereafter into the turbo apparatus. Hereby, for instance in steam production, it is possible to provide pressure up to about 35 bar, which corresponds to about 240°–250° C. for saturated steam, whereby the efficiency ratio for steam production, and thus for the total production of energy, can be improved substantially.

The recovery of the heat energy from the exhaust gases can, with advantage, take place also in two phases, partly before leading the gases into the turbo apparatus and partly after it.

When an engine is operating under a lower engine load, especially below 85 percent of rated power output, recovery of the heat energy from the exhaust gases before leading them into the turbo apparatus is decreased by leading a greater part of the exhaust gases directly into the turbo apparatus. It is thereby ensured that the engine is provided with enough charge air for its combustion process.

BRIEF DESCRIPTION OF THE DRAWINGS

The invention is illustrated by way of example in the attached drawing, in which.

In the different figures, like reference numeral designate corresponding components.

DETAILED DESCRIPTION

Figure 1:
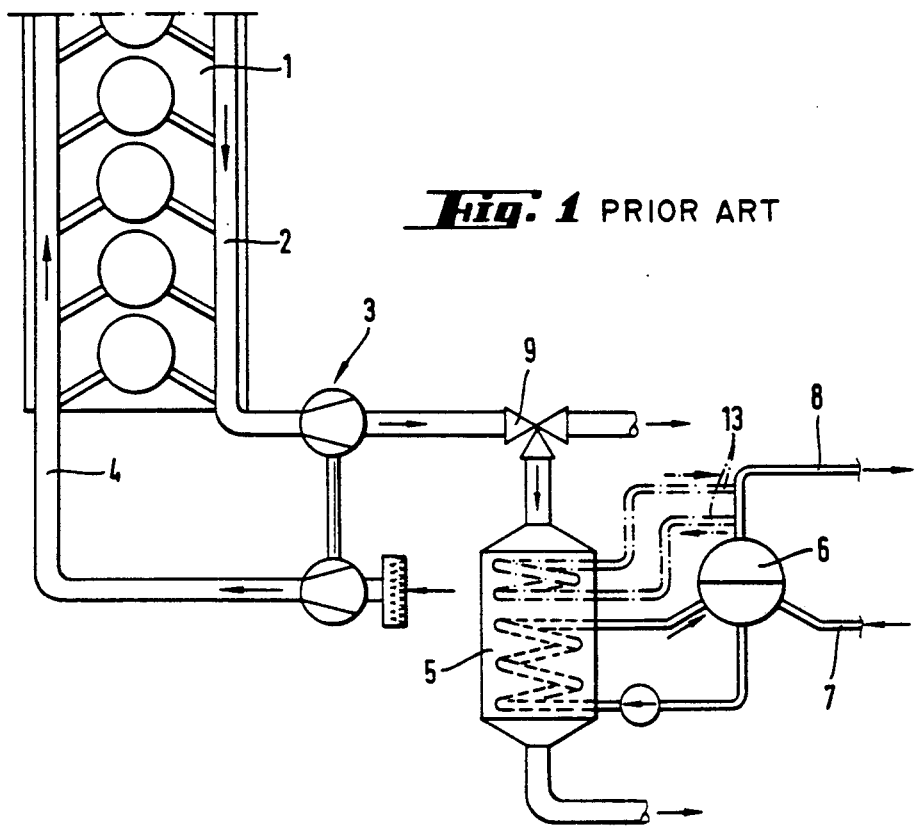
FIG. 1 shows schematically a power plant of known design, based on a big diesel engine and including means for recovering heat from the exhaust gases of the diesel engine.

The power plant shown in FIG. 1 includes a big diesel engine having several cylinders and provided with an exhaust pipe 2. The engine has an output shaft (not shown) driving a mechanical load such as a generator, in the case of an electricity generating plant, or a propeller, in the case of a ship's propulsion power plant. A turbo apparatus 3 includes a turbine connected to the exhaust pipe 2 and a compressor driven by the turbine for feeding charge air into the cylinders of the engine through a feed duct 4 or the like. The exhaust gases are led from the turbine through an exhaust gas boiler 5 for recovering heat energy. A steam generator 6 is connected to the exhaust gas boiler. Water is fed into the generator 6 via a duct 7, and the generated steam is led to its location of use directly via a duct 8. Ducts 13 drawn in dashed line represent an alternative for producing superheated steam, whereby the saturated steam from the steam generator 6 is first led into a superheater zone of the boiler 5 before being led to the location of use. When necessary, some or all the exhaust gases can be led past the exhaust gas boiler 5 by means of a by-pass valve 9.

Figure 2:
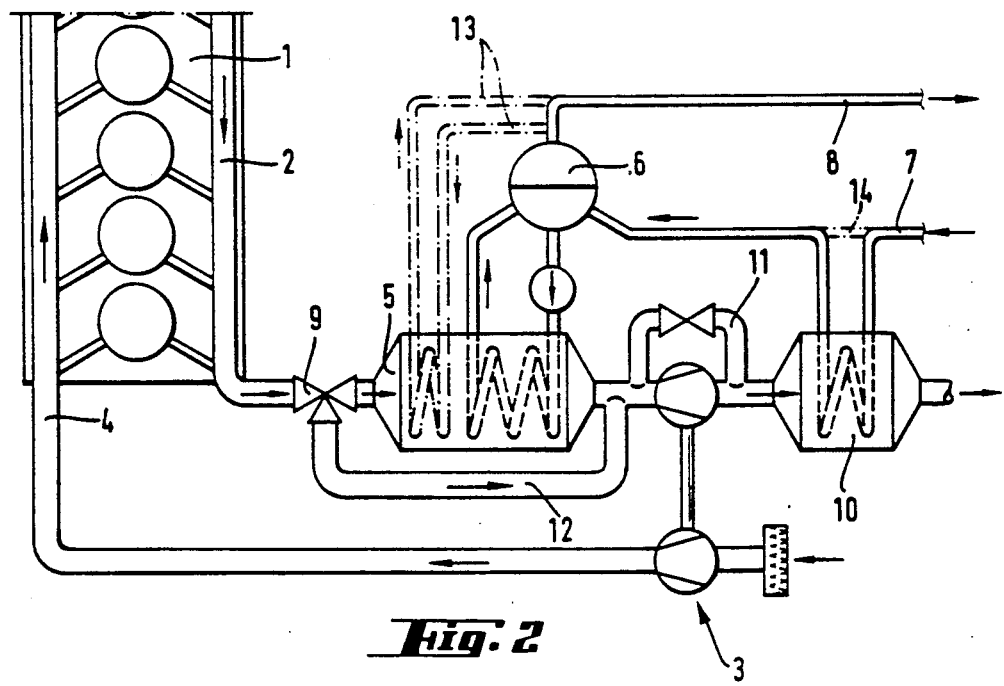
FIG. 2 shows schematically a power plant embodying the present invention.

FIG. 2 shows a power plant that differs from that shown in FIG. 1 by virtue of the fact that the exhaust gas boiler 5 is located before the turbo apparatus. Further, the FIG. 2 power plant includes a second exhaust gas boiler 10, with which the water to be fed into the steam generator 6 can be preheated, and a by-pass 11 for the turbo apparatus. FIG. 2 also shows a duct 14, drawn in dashed line, representing an alternative in the event the economizer 10 is not needed.

By use of the power plant shown in FIG. 2, some of the heat energy in the exhaust gases is recovered by means of the exhaust gas boiler 5 before leading the exhaust gases into the turbo apparatus 3. In this case, the temperature of the exhaust gases fed into the exhaust gas boiler is about 150°–180° C. higher than in the case of FIG. 1, and, in addition, the pressure of the exhaust gases is higher. Therefore, heat transfer between the exhaust gases and the heat exchanger pipes in the boiler 5 is substantially more efficient, whereby the area of the heat exchange surface can be smaller than that of a conventional exhaust gas boiler of the same heat capacity.

An additional advantage of the power plant shown in FIG. 2 is that it is possible to provide higher steam pressures than before through the more effective use of the recovered heat energy, and therefore more refined and more effective steam, so-called superheated steam, is obtained for the needs of separate industrial processes. Thereby, for instance, a better mechanical efficiency ratio is achieved for a steam turbine connected to the boiler, as a result of which also the total efficiency ratio of a diesel heating power plant, and especially the efficiency ratio for the production of electricity, is increased.

In the power plant shown in FIG. 2, the temperature and pressure of the exhaust gases fed into the turbo apparatus 3 are lower than in the power plant shown in FIG. 1, because the feeding takes place only after the exhaust gas boiler 5. This decrease in the energy of the exhaust gases must be taken into account when dimensioning the turbo apparatus. In spite of this, the turbo apparatus 3 is able to feed charge air into the engine at a sufficient rate at heavy loads of the engine. However, in case the engine, in addition to heat production, is used and loaded also for other purposes and the engine is operated, for instance, below 85 percent of its rated power output, at least some of the exhaust gases can be led past the exhaust gas boiler 5 and directly into the turbo apparatus 3 by means of the by-pass valve 9 and a by-pass duct 12. Hereby a sufficient provision of charge air for the engine is ensured. Naturally, the by-pass valve 9 and the duct 12 can also be used, for instance, when the exhaust gas boiler 5 needs cleaning and service.

The invention is not limited to the embodiment shown, but several modifications are feasible within the scope of the attached claims.

I claim:

1. A method of operating a diesel engine provided with turbo apparatus and supplying mechanical power to drive a load, said method comprising:
   (a) at a high engine load,
       (i) recovering at least some of the heat energy contained in the exhaust gases of the engine,
       (ii) leading exhaust gases from which heat energy has been recovered into the turbo apparatus, and
       (iii) recovering heat energy from the exhaust gases after they have passed through the turbo apparatus,
   (b) at a low engine load,
       (i) leading exhaust gases from the engine directly into the turbo apparatus without recovering substantial heat energy therefrom, and
       (ii) recovering heat energy from the exhaust gases that have passed through the turbo apparatus, and
   (c) utilizing the heat energy recovered in step (i) for hot water or steam production and utilizing the heat energy recovered in step (a) (iii) and in step (b) (ii) for preheating feed water for the hot water or steam production.

2. An arrangement for recovering heat energy from the exhaust gases of a diesel engine adapted to supply mechanical power to drive a load and for provision of heat power, said engine being provided with a turbo appearance and an exhaust gas boiler, the improvement residing in means for leading the exhaust gases of the engine into said exhaust gas boiler and thereafter into the turbo apparatus, a hot water or steam generator connected to the heat exchange circuit of the exhaust gas boiler, a second exhaust gas boiler connected to receive exhaust gases from the turbo apparatus for recovering heat from the exhaust gases for preheating the feed water for the hot water or steam generator, and a by-pass duct for leading exhaust gases past the first-mentioned exhaust gas boiler directly into the turbo apparatus, whereby at lower engine loads, especially below the effect rate of 85 percent, the major part of the exhaust gases can be led through said by-pass duct.

3. A power plant comprising:
   a diesel engine adapted to supply mechanical power to drive a load,
   an exhaust pipe connected to the diesel engine for receiving exhaust gases from the engine,
   an intake pipe for feeding air to the engine,
   turbo apparatus comprising a turbine connected to the exhaust pipe to be driven by exhaust gases supplied by the exhaust pipe and a compressor connected to the intake pipe for supplying air under pressure to the engine,
   a first exhaust gas boiler connected in the exhaust pipe between the engine and the turbo apparatus for recovering heat energy from the exhaust gases,
   a hot water or steam generator connected to the heat exchange circuit of the first exhaust gas boiler,
   a second exhaust gas boiler connected to receive exhaust gases from the turbo apparatus for recovering heat from the exhaust gases for preheating the feed water for the hot water or steam generator, and
   a by-pass duct for leading exhaust gases past the first exhaust gas boiler directly into the turbo apparatus, whereby at lower engine loads, especially below the effect rate of 85 percent, the major part of the exhaust gases can be led through said by-pass duct.

4. A method of operating a diesel engine provided with turbo apparatus and supplying mechanical power to drive the load, said method comprising:
   (a) at an effect rate of 85 percent or more, leading exhaust gases from the engine sequentially to a first heat exchanger, for recovering some of the heat energy contained in the exhaust gases, to the turbo apparatus, and to a second heat exchanger, for recovering additional heat energy from the exhaust gases,
   (b) at an effect rate of less than 85 percent, leading exhaust gases from the engine directly to the turbo apparatus, by-passing the first heat exchanger, and leading exhaust gases from the turbo apparatus to the second heat exchanger, and
   (c) utilizing heat energy recovered in step (a) in the first heat exchanger for hot water or steam production and utilizing heat energy recovered in the second heat exchanger for preheating feed water for the hot water or steam production.

* * * * *